May 26, 1970    J. J. FITZGERALD ET AL    3,513,824
UNDERWATER PORTABLE HEATING SYSTEM
Filed June 27, 1966    5 Sheets-Sheet 1

INVENTORS
KENNETH E. MAYO
JOSEPH J. FITZGERALD
BY
ATTORNEY

INVENTORS
KENNETH E. MAYO
JOSEPH J. FITZGERALD
ATTORNEY

May 26, 1970  J. J. FITZGERALD ET AL  3,513,824
UNDERWATER PORTABLE HEATING SYSTEM
Filed June 27, 1966  5 Sheets-Sheet 5

INVENTORS
KENNETH E. MAYO
JOSEPH J. FITZGERALD
BY
ATTORNEY

United States Patent Office 3,513,824
Patented May 26, 1970

3,513,824
UNDERWATER PORTABLE HEATING SYSTEM
Joseph J. Fitzgerald, 7 Squire Road, Winchester, Mass. 01890, and Kenneth E. Mayo, 96 Wellington St., Nashua, N.H. 03060
Filed June 27, 1966, Ser. No. 560,511
Int. Cl. A61f 7/06
U.S. Cl. 126—204                        32 Claims

ABSTRACT OF THE DISCLOSURE

A portable heating system is herein disclosed. The apparatus includes a radioactive heat source which is employed in conjunction with a fluid to heat, for example, a diver's garment. The heat source is also used to heat the hot junctions of a thermoelectric generator which supplies an electrical output to power a motor that drives a circulating pump for the fluid, as well as providing electrical power for other functions. The heat source preferably uses fuel having appropriate radioisotope decay characteristics to provide long-time operation in conjunction with minimal shielding requirements.

---

This invention relates to a portable heating system for use in remote locations. More particularly, it relates to a heating system worn by an undersea diver to keep him warm at great depths and for extended periods of time. The system generates heat through the decay of radioactive or other fuels. The heat in turn is absorbed by a fluid which then flows through a garment of the diver to maintain a warm environment for his body.

A diver who remains in the water for more than brief intervals must wear clothing that provides an effective thermal barrier if the water temperature is significantly below his body temperature. Otherwise, the water will conduct body heat away much faster than the body can replace it, with deleterious effects on the diver's efficiency, and more important, his health and safety.

Prior to the present invention, the most efficient thermal barrier has been a unicellular foam diving suit, which permits operation even in frigid water. However, such material is ineffective at great depths, since the pressure at these depths compresses the foam and thereby materially degrades its insulating properties. Moreover, at the present time, divers operating at great depths breathe atmospheres containing helium as a substitute for nitrogen. The helium permeates the diver's body and substantially increases its thermal conductivity, thereby furthering the loss of body heat.

The present invention has as its principal object the provision of a thermal barrier system for divers, effective at depths up to 600 feet or more and at temperatures down to 45° F. or less. The barrier should protect the diver against undue loss of body heat or provide additional heat for extended periods of time, that is, for a matter of days or weeks, rather than minutes or hours.

Another object of the invention is to provide a system which has the above characteristics and yet does not unduly interfere with the diver's normal physical capabilities. More specifically, the system should not unduly hinder the diver in the performance of the various missions which might be assigned to him.

A further object of the invention is to provide a system of the above type that is compatible with other gear carried or worn by the diver.

Yet another object is to provide a system of the above type which is adjustable to compensate for different water temperatures, for the level of activity in which the diver is engaged, and for the garment temperature which he finds most comfortable.

A still further object of the invention is to provide a thermal barrier system of the above type which is reliable and requires a minimum of servicing during use.

Another object is to provide a power generating unit for use in a system having the above characteristics.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 2:
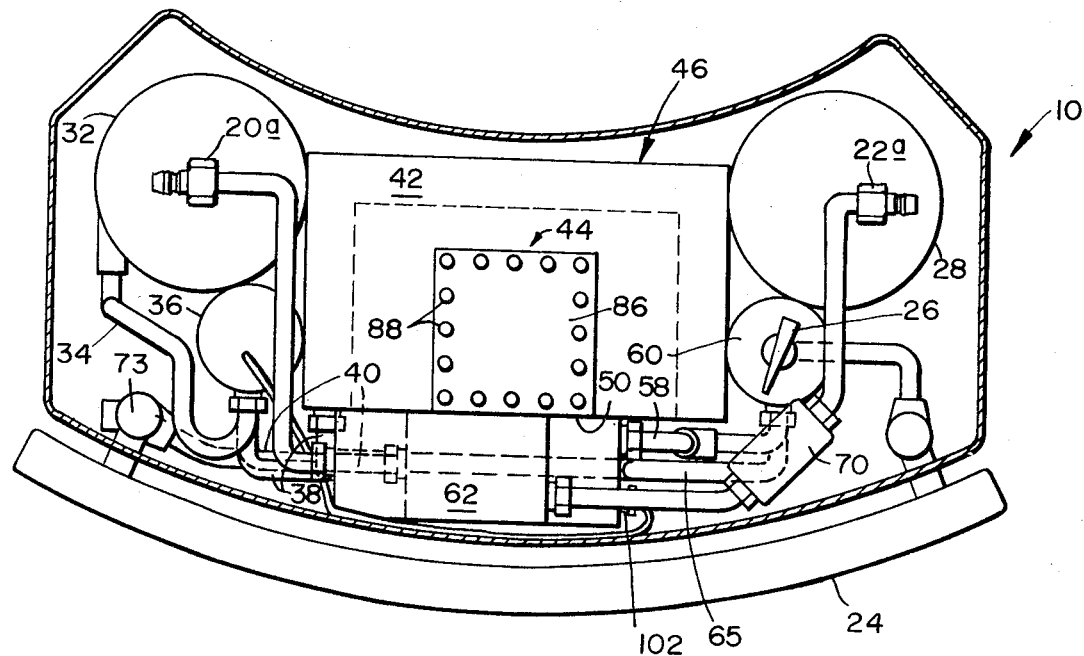
FIG. 2 is a top view of the power generating unit with the top of the housing broken away to show interior parts.

In general, a thermal barrier system embodying the invention employs a radioactive heat source that heats a fluid barrier interposed between the diver and his cold water environment. Specifically, the diver wears an undergarment comprising a mesh of tubing through which the heated fluid is pumped. Suits of this type are presently used by astronauts as barriers against high temperature environments, and therefore need not be described in detail herein.

Water is the preferred heat exchange fluid for the system. It works well at the temperatures involved. It is compatible with tubing, conduits and other components made of conventional materials readily fabricated into their desired form. Moreover, leakage of water from the system poses no threat to the user or others in terms of poison or other health or safety hazards. Nor does leakage inwardly from the environment pose a serious contamination problem in the heat exchange system; in fact, as explained below, some water will generally be taken in when connections are made in the operating environment.

The heat exchange function is accomplished with a single loop system. That is, the fluid is directly heated by direct thermal conduction from the fuel and then circulated through the diver's garment, where it is cooled by the surrounding water and then returned for reheating. The fuel is selected with low radiation dose rates and shielding considerations so that any radiation which might contaminate the system of the diver is either non-existent or of negligible proportion. The fuel also serves to heat the hot junctions of a thermoelectric generator. The electrical output of the generator powers a motor that drives a circulating pump for the heat exchange fluid. Enough power is also available for other functions such as the flashing of a light which indicates the position of the diver in the darkness that prevails at great depths or the position of the power generating unit if the latter is dropped, and to operate search light, cameras, electrical tools, etc.

The heater is charged with enough fuel, having appropriate radio isotope decay characteristics, to provide operation over a substantial period for example, several months. As the fuel is gradually depleted by radioactive decay, the thermal output of the heater decreases, and therefore the unit is designed to provide at the outset a substantially greater output than required for thermal protection of the diver and operation of the electrical equipment powered by the unit. The excess heat is rejected by cooling a portion of the heat exchange fluid in a heat exchanger directly contacted by sea water. This temperature arrangement is adjustable by the user to provide the undergarment temperature most comfortable for him.

Any suitable nuclear fuel may be employed in carrying out the invention, however, the preferred fuel is thulium 170 or thulium 171, or a combination of the two. The fuel, in its preferred form is thulium oxide ($Tm_2O_3$) which decays to ytterbium oxide with the accompanying production of heat. Both thulium 170 and thulium 171 are produced by neutron irradiation of the naturally occurring thulium 169. The proportions of the two radioactive isotopes produced depend on the intensity and duration of irradiation. Among the advantages of Tm 170 are its economy in terms of cost per watt (thermal) output and its relatively small bulk in a unit providing the desired thermal output, e.g., around 400 to 500 watts.

Tm 171 is also an ideal fuel, especially with regard to the shielding requirement, which is minimal if this material is used alone. However, at present the cost of Tm 171 is substantially greater than that of Tm 170. Also, its thermal power density is substantially less than that of Tm 170. On the other hand, TM 171 has a substantially longer half-power life than Tm 170, i.e., 1.9 years as compared with four months.

Accordingly it is generally desirable to use a mixture of Tm 170 and Tm 171 to obtain some of the desirable properties of each. The proportion of these two ingredients depends on the relative values of these characteristics in the particular application in which the fuel is used. As an example, approximately 1800 grams of $Tm_2O_3$ (Tm 169) can be irradiated to provide equal amounts of Tm 170 and Tm 171 having a combined thermal output of 500 watts and a half-power life of nine months. At the end of its half-power life the charge will still provide sufficient heat for operation of a diver's thermal barrier.

Only a small part of the initial Tm 169 charge is converted to Tm 170 and Tm 171 when the charge is irradiated. Accordingly, after the fuel has become depleted, the cell can be irradiated again to reactivate it, and this process can be repeated a number of times before the remaining thulium has to be separated from the decay-product element ytterbium to provide a sufficient fuel density for proper operation of the diver's thermal barrier.

In its preferred form the power generating unit to which the diver's thermal undergarment is connected is shaped to fit against the user's abdomen, and in so doing it replaces some of the conventional lead weights that divers carry on belts designed for that purpose. Thus, the unit imposes little or no additional impediment to the diver's performance of the tasks assigned to him. Also, the heat exchanger used for tempering the water heated by the fuel is exposed to the sea water on the front surface of the heating unit. In this position it serves as a convenient hand warmer for the diver. This is particularly important since the thermal undergarments do not ordinarily cover the diver's hands and gloves have generally been found to unduly impede divers in the performance of their work.

Figure 1:
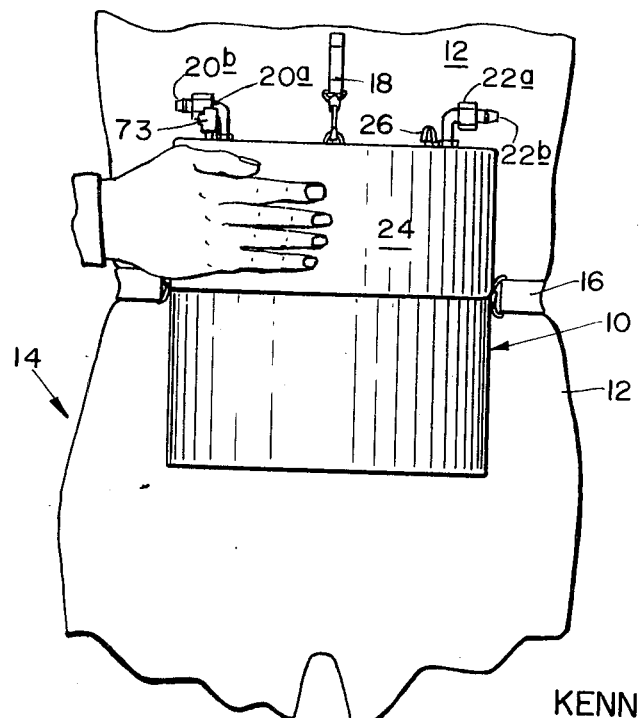
FIG. 1 is a front view of a thermal barrier system incorporating the invention.

As shown in FIG. 1, a thermal barrier system embodying the invention includes a heat generating unit, generally indicated at 10, connected to pass a warmed heat exhange fluid through an undergarment 12 worn by a diver 14. Although the unit 10 is shown in FIG. 1 as being adapted to be worn in front of the diver, it can be designed just as well to be carried on his back.

The generating unit 10 is fastened to the diver by means of a suitably attached belt 16 and a further fastener 18 attached to the diver's suit or breathing apparatus harness if more convenient. A heat exchange fluid from the generating unit is pumped through internal tubing (not shown) in the garment 12 by means of mating outlet couplings 20a and 20b and inlet couplings 22a and 22b. The couplings are of the so-called "quick-disconnect" type, which are readily connected and disconnected. There is an internal valve in each of the mating couplings, with the valves arranged to be opened for passage of fluid therethrough only when the couplings are connected together.

The heat generating unit 10 is contoured to fit comfortably and snugly against the diver's abdomen, as best seen in FIG. 2. Also, it is small enough in dimension to be compatible with the physical movements of the diver as he goes on about his tasks. A tempering heat exchanger 24, disposed along the upper part of the front surface of the generating unit, provides a source of heat to warm the diver's hands, as illustrated in FIG. 1. The user can control the temperature of the fluid circulating through the garment 12 by means of a dial 26 accessible on the top of the unit 10.

Figure 4:
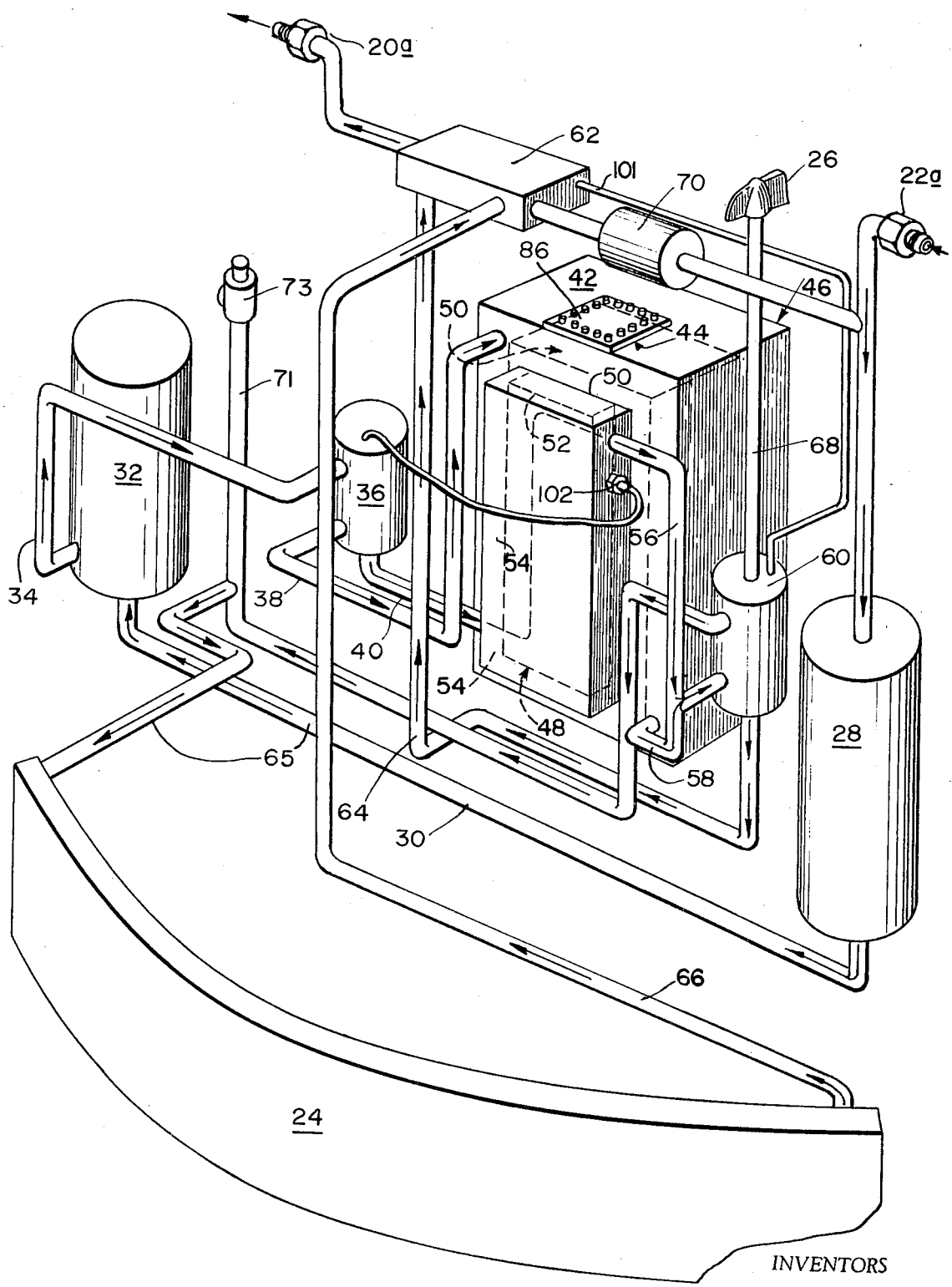
FIG. 4 is a schematic diagram in pictorial form of the system.

FIG. 4 illustrates the schematic arrangement of the heat generating unit 10 as well as generally indicating a convenient disposition of the various elements of the unit. The heat exchange fluid returning from the diver's garment by way of the coupling 22a passes first through an optional ion exchange column 28 vertically disposed along one side of the unit. The column 28 removes salts which may have entered the system through the medium of the surrounding sea water, e.g., when the generating unit 10 is coupled to or uncoupled from the diver's garment while under water. The ion exchange column 28 may be eliminated when diving in fresh water or material highly resistant to salt water corrosion is used in the unit. Furthermore, a filter may be used in place of the ion exchange column if the unit is operated in water containing suspended solid impurities. The fluid then passes through a conduit 30 connected to the inlet of a sealed pump and motor assembly 32 which circulates the fluid around the system. A conduit 34 connects the outlet of the assembly 32 to the inlet of a temperature controlled proportioning valve 36, which divides the fluid between a pair of conduits 38 and 40.

Fluid in the conduit 38 enters the inlet of a water jacket 42 largely surrounding the fuel assembly 44 in a centrally disposed heater generally indicated at 46. A thermoelectric generator 48 has a heated surface 50 on the front of the heater 46 and in close thermal conducting relationship with the fuel cell 44. The thermoelectric generator 48 has a cooled surface 52 forming one enclosure of a water jacket 54, whose inlet receives fluid from the conduit 40. Together the water jackets 42 and 54 almost completely surround the heater 46 so as to absorb essentially all of the heat generated from the heater.

From the outlets of the water jackets 42 and 54, the fluid passes through conduits 56 and 58 to the inlet of a temperature controlled proportioning valve 60. A portion of the fluid leaving the valve 60 passes directly to a mixing plenum 62 by way of a conduit 64. The other outlet of the valve 60 is connected to the inlet of the tempering heat exchanger 24 by way of a conduit 65. The fluid passing through the heat exchanger 24, which is cooled by the sea water surrounding the heat exchanger, enters the plenum 62 by way of a return conduit 66. From the plenum 62 the fluid passes through the coupling 20a to the diver's garment 12 (FIG. 1).

The fluid entering the proportioning valve 60 from the water jackets 42 and 54 is considerably hotter than required for use as a thermal barrier in the garment 12. That portion of the fluid which passes through the heat exchanger 24 and is cooled thereby provides a tempering action in the plenum 62 by reducing the temperature of the combined fluid therein to a comfortable level. By means of dial 26, and a shaft 68 connected to valve 60, the diver can adjust the control point of the temperature control valve, adjusting the relative portion of the heat exchange fluid passing through the heat exchanger 24, and hence adjusting the temperature of the fluid leaving the plenum. The temperature of the fluid leaving the plenum is sensed via connection 101 which operates control valve 60.

Also included in the heat generating unit 10 is a pressure bypass valve 70 connected between the plenum 62 and the inlet of the ion exchange column 28. The valve 70 prevents overpressure in the garment 12. It also provides for circulation of the fluid whenever the garment is disconnected from the generating unit 10. This insures removal of heat from the heater 46 by means of the water jackets 42 and 54 and thereby prevents overheating of the system in such cases. Moreover, it prevents the imposition of an overload on the pump and motor assembly 32 when the garment is disconnected.

A conduit 71 extends upwardly from the conduit 65 to an air escape valve 73 disposed above the rest of the generating unit 10. The valve 73 purges air from the system in which the heat exchange fluid circulates.

Figure 6:
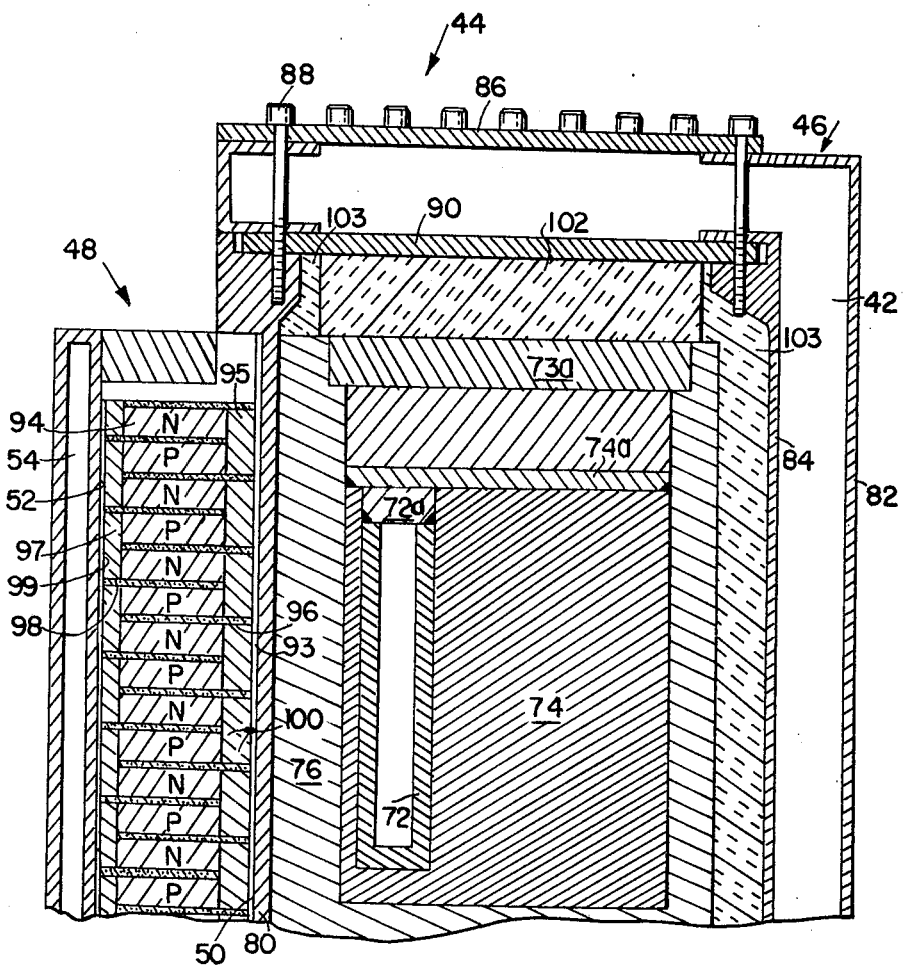
FIG. 6 is a fragmentary section of the heater-thermoelectric generator assembly, taken along line 6—6 of FIG. 3.

The constructional details of the heater 46 and thermoelectric generator 48 are shown in FIG. 6. The fuel assembly 44 includes a stainless steel capsule 72 containing the fuel and surrounded by an integral radiation shield 74. The capsule and shield include cover plates 72a and 74a welded in place to provide hermetic seals. The shield 74 fits within a recess in a further shield 76, and thermal insulation layers 102 and 103.

The water jacket 42, which comprises stainless steel walls 82 and 84, substantially surrounds the shield 76 and thermal insulation 102 and 103. The remaining portion of the shield 76 is covered by a front cover plate 80 whose outer surface is the heated surface 50 of the thermoelectric generator 48. The greater bulk of the shield 76 is disposed adjacent to the top, rear and bottom of the capsule 72, as well as the right and left ends thereof (FIG. 6) all of which surfaces face the diver to some extent.

The water jacket 42 is preferably disposed on the outer surface of the shielding and insulation as shown, in order to enable the heat source 72 to operate at a high temperature desirable for the thermoelectric generator 48 and yet to conduct the desired amount of heat at a lower temperature suitable for the water heating surface 84 without generating steam at any of the operating pressures of the heating system.

Access to the capsule 72 is provided by means of a removable cover plate 86 secured over an aperture in the top of the water jacket 42 by means of bolts 88 extending downwardly into the shield 76. A similar plate 90, which seals an aperture in the water jacket wall 84 is also held in place by the bolts 88. When the bolts 88 are removed, the plate 90 can be slid outwardly to the left (FIG. 6) after which a succession of stepped segments of the shield 76 can be removed to reach the inner shield 74 and the capsule 72 contained therein.

Tungsten is the preferred material for the radiation shield 74. Tungsten and depleted uranium or other high density material are suitable for the shields 74 and 76. Assuming that the capsule 72 contains a thulium 170 charge having a 500-watt (thermal) output, the portions of the shield 76 between the capsule and the diver, i.e., between the capsule and the water jacket 42, should have a thickness of at least 6 cm. if uranium is used.

If thulium 171 is used for the fuel charge or a portion thereof to provide a longer operating period between refueling, the lower power density of the thulium 171 can be accommodated in the fuel assembly 44 by eliminating a portion or all of shields 74 and 74a due to the lower radiation hazard of thulium 171. Thus, a great variety of fuel capsules having predetermined life characteristics can be utilized within the same space occupied by shields 74 and 74a.

The thermoelectric generator in one embodiment may have a conventional construction comprising a stack or stacks of thermoelectric P and N elements with insulating spacers between them, 96 and 98. Typical arrangements will provide electrical connections between alternating P and N materials at the hot surface 95; and electrical connections at the cold surface 97, joining the P and N "couples" in series and/or parallel as required. The P and N materials will be electrically insulated at the hot and cold surfaces by suitable insulation such as mica 93. Although the invention has been described using a thermoelectric generator operating on the well known Seebeck effect, any suitable thermoelectric generator which produces sufficient electrical power from a heat source is satisfactory.

As also shown in FIG. 6, temperature sensor 100 is affixed to the surface 50 to monitor the temperature thereof. With reference to FIG. 4 the leads from the temperature sensor 100 extend from a connector 102 in the generator 48 to the valve 36. The valve includes suitable components for converting the signal from the temperature sensor and using it to control relative flows in the conduits 38 and 40, i.e., through the water jackets 42 and 52. The operation of this valve can be performed directly by the use of a fluid in temperature sensor 100 having the characteristic of expansion with increase of temperature thereby operating the proportional mixing valve 36. Operation of the valve 36 protects the thermoelectric generator from excessive heat during the initial portion of the life of the fuel chagre in the heater 46 and at the same time tends to maintain the electrical output of the generator relatively constant as the fuel is depleted.

Specifically, since more heat is generated in the heater 46 when it contains a fresh charge of fuel, its temperature will be relatively high at this time for a given flow through the water jacket 42. This temperature may be excessive for some thermoelectric generator materials, and therefore, in response to the signal from the temperature sensor 102, the valve 36 maintains a relatively large flow rate through the water jacket 42, thereby maintaining the heater temperature, or more specifically the temperature at the interface between the generator 48 and the heater 46, at a safe level. As the fuel is depleted so that its thermal output gradually decreases, the temperature of the heater tends to decrease, and the resulting signal from the thermocouple causes the valve 36 to decrease the flow through the water jacket 42. Less heat is therefore removed from the heater 46 by means of the water jacket 42, and this minimizes the temperature change at the surface 50 resulting from fuel depletion.

The decrease in flow through the water jacket 42 is, of course, offset by a corresponding increase in the flow through the water jacket 54 on the cooled side of the thermoelectric generator 48. However, this does not materially affect the temperature of the cooled side of the generator. The thermal resistance between the thermoelectric elements in the generator 48 and the coolant flowing through the water jacket 54 is so related to the flow rate through this water jacket at minimum flow that at this minimum flow the temperature of the cooled side of the generator 48 is not significantly decreased by an increased flow through the water jacket.

Thus, the system tends to maintain constant temperatures on both the cooled and heated sides of the thermoelectric generator 48 over the operating life of the fuel charge in the heater 46, and thereby maintains a substantially constant output voltage for the pump and motor assembly 32 as well as other electrically operated devices powered by the generator 48.

While the system described utilizes tempering of the water by means of cooler 24, often the circulated fluid is heated by the heater 46 and the water jacket 54. Another embodiment of the invention would cool the water before entering the water jacket 54. This alternate embodiment would result in higher operating efficiency of the thermoelectric unit where this is desirable.

Figure 3:
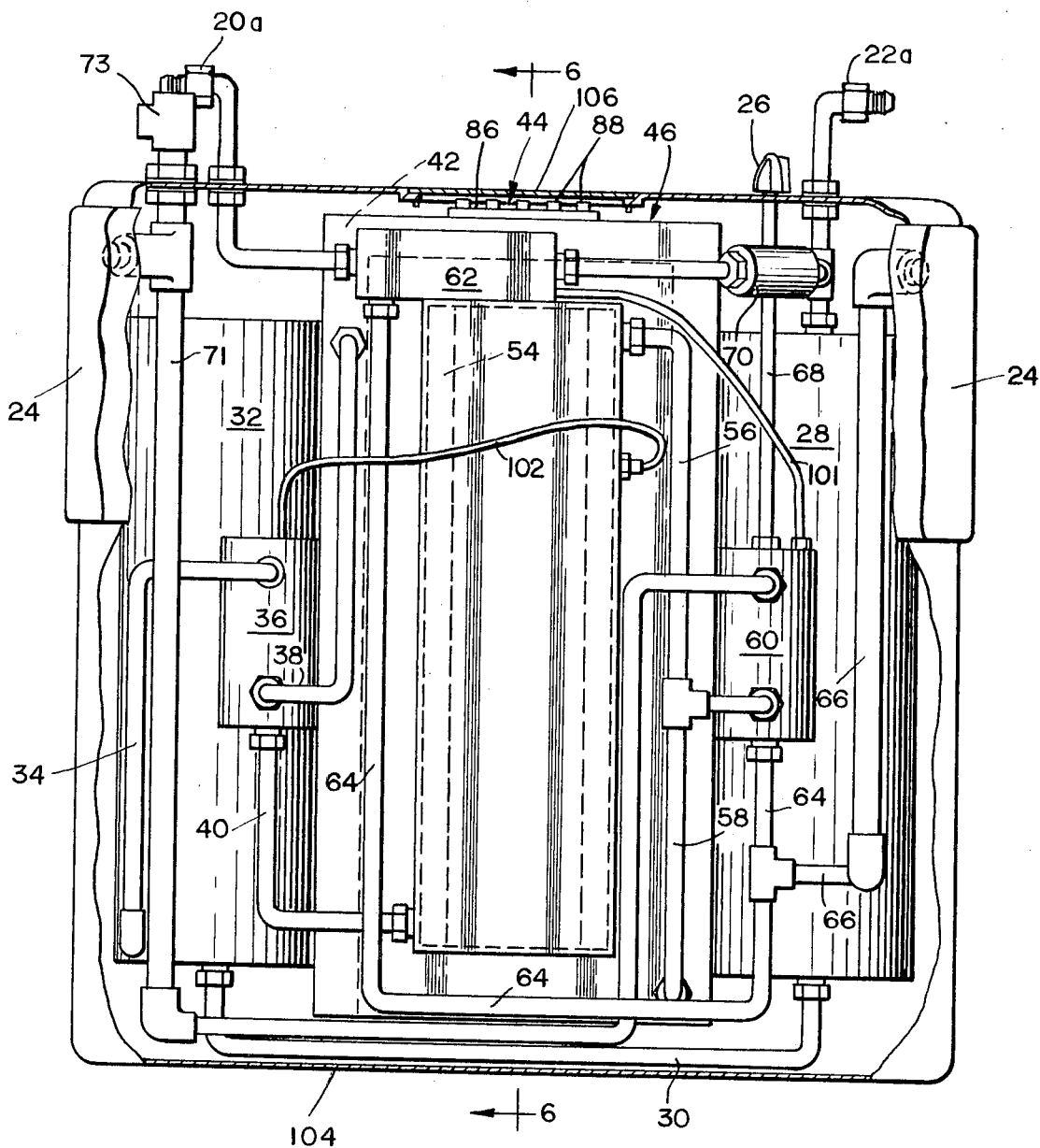
FIG. 3 is a front view, partly broken away, of the power generating unit.
Figure 5:
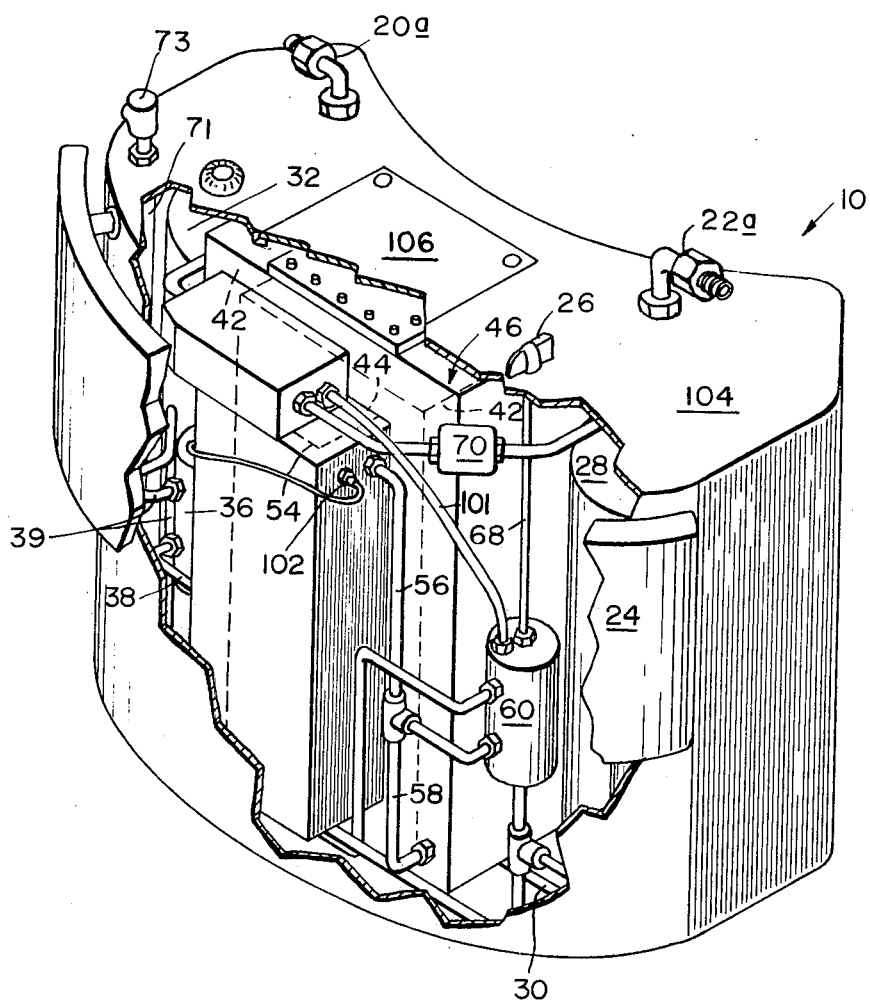
FIG. 5 is a perspective view, partly broken away, of the heater unit.

FIGS. 2, 3 and 5 depict a convenient physical arrangement of the various components of the power generating unit 10. The relatively heavy heater 46 is centrally disposed (left to right) to facilitate balance of the unit. For the same reason, the heater is situated near the back of the unit 10, as shown in FIG. 2. The thermoelectric generator 48, which is physically attached to the heater 46 and which does not require the same degree of radiation protection as the person carrying the unit, is in front of the unit, where there is less radiation shielding. The ion exchange column 28 is disposed near the inlet coupling 22a on one side of the heater 46, with the valve 60 being situated near the heater and in front of the ion exchange column.

Balancing these components on the other side of the heater are the pump and motor assembly 32 and the valve 36. Since the thermoelectric generator 48 does not cover the entire front surface of the heater 46, the space around the generator 48 is used to advantage to accommodate various conduits as well as the plenum 62. The air release valve 73 is located off to one side, where it is out of the way and where any bubbles issuing therefrom will not obscure the diver's vision.

The heat generating unit 10 is preferably enclosed in a housing 104, capable of withstanding pressure at the depth of operation. To avoid the necessity for an inordinately thick and heavy housing, supporting beams and webs (not shown) may be disposed across the interior of the heat generating unit in various directions to support the walls of the housing against the external pressure. The spaces in the interior of the housing that are not occupied by the various illustrated components can then be filled with suitable lightweight thermal insulation to prevent undesirable leakage of heat. This also contributes to a minimum overall density for the heat generating unit with a consequent relatively low weight in water.

In the preferred embodiment of the invention the various conduits and electrical connections extending through the housing will of course be hermetically sealed. Also, a cover plate 106 bolted into place in the top of the housing 104 provides for access to the heater 46 and more particularly the fuel capsule disposed therein.

Thus we have described an improved thermal barrier system for use by divers operating at great depths. The system comprises a radioactive heat source arranged to heat a fluid that is pumped through a garment worn by the diver to keep him warm. The heat source also provides the heat for a thermoelectric generator whose output operates the circulating pump for the fluid as well as various lights, electric tools and other devices which may be used by the diver. The power generating unit comprising the heat source, thermoelectric generator, circulating pump and other elements of the system is a compact unit easily carried by the diver. It does not unduly hinder him in the performance of his work and it is readily transferred from one diver to another even at the depths at which it is designed to operate.

The unit also includes a heat exchanger used to temper the hot fluid coming from the heater and serving double duty as a hand warmer disposed in front of the unit. The diver can readily adjust the temperature of the fluid entering his heated garment to fit the environmental conditions, his physical activity and his own preferences for temperature level.

The invention can be used with any suitable nuclear fuel, however, the preferred fuel is thulium 170 or thulium 171 in the oxide form, or mixtures of the two. By varying the relative amounts of these two materials, the life of the fuel charge can be adjusted over a wide range. In fact, the fuel charge can power the unit continuously for more than a year.

While the preferred embodiment described above utilizing nuclear fuels is suitable for operation for extremely long periods of time without refueling, another embodiment of the invention utilizing chemical fuels is suitable where the fuel can be replaced in shorter intervals. For example, where operation for short periods, varying from a few hours to several days, are required or operating periods are interspersed with periods of non-use, the nuclear fueled unit 44 can be replaced with a suitable chemically fueled heat generator.

This chemically fueled heat generator would have provision for controllably feeding fuel and suitable oxidizer into a reaction chamber. The temperature would be controlled by varying the rate of supply of the fuel and oxidizer. The heat sensing controls would operate in the manner similar to that described above but would control the fuel and oxidizer rates. The water tempering system could be simplified depending on the amount of electrical power required.

Suitable chemicals, meant to be illustrative and not to be considered as limiting, are: Boron, beryllium, decaborane and aniline used with a suitable oxidizer such as sodium super oxide or potassium super oxide.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A power source comprising
   (A) a heat source of the type using an exothermic reaction to generate heat,
   (B) means forming a first fluid jacket in close thermal conducting relationship with said source and arranged thereby to heat a fluid with heat from said source,
   (C) inlet means,
   (D) first fluid conveying means connected to convey said fluid from said inlet means to said jacket,
   (E) outlet means,
   (F) second fluid conveying means connected to convey said fluid from said jacket to said outlet means,
   (G) a heat exchanger arranged to conduct heat from said fluid to an environmental fluid,
   (H) third fluid conveying means connected to convey a portion of the fluid from said first jacket through said heat exchanger and thence to said outlet means, whereby said second and third conveying means provide parallel paths for said fluid from said jacket, and
   (I) a utilization means coupled between said inlet and outlet means.

2. The combination defined in claim 1 including a first proportioning valve connected to vary the relative proportions of said fluid flowing through said second and third conveying means, thereby to control the temperature of the fluid at said outlet means.

3. The combination defined in claim 1
   (A) including a thermoelectric generator having heated and cooled portions,
   (B) including means conducting heat from said heat source to said thermoelectric generator heated portions, said fluid jacket arranged to conduct heat from said cooled portions of said thermoelectric generator.

4. The combination defined in claim 1
   (A) including a thermoelectric generator having heated and cooled portions,
   (B) including means conducting heat from said source to said heated portions,
   (C) including a second fluid jacket arranged to conduct heat from said cooled portions, (D) said first fluid conveying means being connected to convey said fluid from said inlet means to said second jacket,
(E) including means combining the fluid outputs of said first and second jackets.

5. The combination defined in claim 4 in which said first fluid conveying means includes a second proportioning valve for controlling the relative proportions of fluid flowing through said first and second jackets.

6. The combination defined in claim 5
(A) in which said second valve is arranged to respond to the thermal output of said heat source,
(B) whereby the relative proportion of fluid flowing through said first jacket decreases as the thermal output of said source decreases.

7. The combination defined in claim 1 in which said heat source contains a fuel from the class of materials consisting of thulium 170 and thulium 171.

8. The combination defined in claim 7 wherein said fuel from the class of materials consisting of thulium 170 and thulium 171 is an oxide form.

9. A thermal barrier system comprising
(A) a garment having fluid passageways,
(B) a heat source of the type that generates heat through nuclear reaction of a fuel contained therein, said fuel having a half-life of more than six hours,
(C) a single-loop fluid circulating system arranged to
    (1) heat a heat-conveying fluid by means of direct thermal conduction from said source, and
    (2) circulate said fluid through said garment passageways.

10. The combination defined in claim 9 including a heat generating unit comprising
(A) means for attaching said unit to a garment user thereof,
(B) said heat source,
(C) means forming a first fluid jacket arranged to intercept heat conducted from said source,
(D) a pump connected to pump fluid from said garment through said first jacket and back to said garment, and
(E) a radiation shield
    (1) disposed between said source and said user, and
    (2) arranged to maintain at a safe level the radiation reaching said user from said source.

11. The combination defined in claim 10 in which said shield is disposed between said heat source and said first jacket.

12. The combination defined in claim 10 including
(A) a tempering heat exchanger exposed to an environmental fluid surrounding said user,
(B) means for passing a portion of the fluid from said first jacket through said heat exchanger, thereby to temper said fluid before it enters said garment, and
(C) means operable by the wearer of said garment for varying the portion of fluid from said jacket that passes through said heat exchanger, thereby to adjust the temperature of the fluid entering said garment.

13. The combination defined in claim 10
(A) including a thermoelectric generator having heated and cooled portions,
(B) in which said heated portions are in close thermal conducting relationship with said heat source,
(C) including means forming a second fluid jacket arranged to conduct heat from said cooled portions,
(D) including means for circulating through said second jacket a portion of the fluid leaving said garment, thereby to maintain a temperature difference between said heated and cooled portions.

14. The combinations defined in claim 13 including a proportioning valve
(A) receiving the fluid returning from said garment, and,
(B) dividing said returning fluid between said first and second jackets.

15. The combination defined in claim 14
(A) in which said proportioning valve is arranged to respond to the thermal output of said heat source,
(B) thereby to decrease the relative proportion of fluid flowing through said first jacket as said thermal output of said cell decreases.

16. The combination defined in claim 12
(A) including a thermoelectric generator having heated and cooled portions,
(B) in which said heated portions are in close thermal conducting relationship with said heat source,
(C) including means forming a second fluid jacket arranged to conduct heat from said cooled portions.
(D) including means for circulating through said second jacket a portion of the fluid leaving said garment, thereby to maintain a temperature difference between said heated and cooled portions.

17. The combination defined in claim 16 including a proportioning valve
(A) receiving the fluid returning from said garment, and
(B) dividing the returning fluid between said first and second jackets.

18. The combination defined in claim 17
(A) in which said proportioning valve is ararnged to respond to the thermal output of said heat source,
(B) thereby to decrease the relative proportion of fluid flowing through said first jacket as said thermal output of said cell decreases.

19. The combination defined in claim 9 in which said heat source contains fuel from the group consisting of thulium 170 and thulium 171.

20. The combination of claim 19 wherein predetermined amounts and ratios of thulium 170 and thulium 117 are selected to provide a heat source having desired life, power density and radiation characteristics.

21. The combination defined in claim 19 wherein said fuel from the class of materials consists of thulium 170 and thulium 171 in an oxide form.

22. The combination defined in claim 10 in which said heat generating unit includes
(A) first and second couplings for delivering said fluid to and receiving said fluid from said garment, said couplings and said garment defining a first fluid path, and
(B) means including a pressure bypass valve forming a second fluid path in parallel with said first path.

23. A power generating unit comprising
(A) a housing having
    (1) a back surface to be held against the body of the user of said unit, and
    (2) a front surface facing away from the user's body,
(B) a heater comprising
    (1) a heat source developing heat by means of nuclear reactions,
    (2) a first fluid jacket substantially surrounding said heat source except on a front surface thereof,
    (3) radiation shielding
        (a) completely surrounding said heat source,
        (b) disposed between said source and said first fluid jacket,
(C) a thermoelectric generator having heated and cooled portions, said thermoelectric generator
    (1) being disposed in front of said heat source,
    (2) including means connecting said heated portions in close thermal conducting relationship with said heat source,
    (3) having a second fluid jacket
        (a) disposed in front of said portions, and
        (b) arranged to cool said cooled portions,
(D) fluid inlet means through which fluid enters said power generating unit, (E) a first proportioning valve
  (1) connected between said inlet means and said first and second jackets,
  (2) arranged to proportion the relative flow of fluid between said first and second jackets, and
  (3) responsive to the thermal output of said heat source to decrease the relative flow of fluid through said first jacket as the said thermal output decreases,
(F) outlet means from which said fluid leaves said fluid generating unit,
(G) a heat exchanger
  (1) disposed outside of said housing and accessible to the hands of said user,
  (2) arranged to exchange heat between the fluid flowing through it and the environmental fluid surrounding said user,
(H) a manually controlled second proportioning valve
  (1) having a valve inlet connected to receive the fluid from said first and second jackets,
  (2) having first and second valve outlets,
  (3) dividing between said first and second outlets the fluid entering said valve inlet,
(I) means connecting said heat exchanger between one of said valve outlets and said outlet means,
(J) means forming a second fluid flow path between the other of said valve outlets and said outlet means,
(K) means mounted on the exterior of said housing and readily accessible to said user for adjusting said second valve to control the relative proportions of the fluid from said first and second jackets passing through said heat exchanger and said second path, thereby to control the temperature of the fluid leaving said outlet means,
(L) a pump
  (1) powered by the outlet of said thermoelectric generator, and
  (2) connected to pump said fluid within said power generating unit from said inlet means to said outlet means.

24. The combination defined in claim 23 in which
(A) said back surface of said housing has a contour to fit the abdomen of said user, and
(B) in which said heat exchanger is disospsed in front of said housing.

25. The combination defined in claim 23 including a pressure relief valve connected between said inlet means and said outlet means.

26. The combination defined in claim 23 including a plenum chamber connected to mix the fluid from said heat exchanger and said second path before said fluid leaves said outlet means.

27. The combination defined in claim 26 including an ion exchange column connected between said inlet means and said first proportioning valve.

28. The combination defined in claim 27 in which said fuel includes material from the group consisting of thulium 170 and thulium 171.

29. A thermal barrier system comprising
(A) a garment having fluid passageways,
(B) a heat generating unit including
  (1) means for ataching said unit to a garment user thereof,
  (2) a heat source of the type that generates heat through chemical reaction of a fuel contained therein
  (3) means forming a first fluid jacket arranged to intercept heat conducted from said source, and
  (4) a pump connected to pump fluid from said garment through said first jacket and back to said garment,
(C) a single-loop fluid circulating system arranged to
  (1) heat a heat-conveying fluid by means of direct thermal conduction from said source, and,
  (2) circulate said fluid through said garment passageways,
(D) a thermoelectric generator having heated and cooled portions,
  (1) in which said heated portions are in close thermal conducting relationship with said heat source,
(E) means forming a second fluid jacket arranged to conduct heat from said cooled portions, and
(F) means for circulating through said second jacket a portion of the fluid leaving said garment, thereby to maintain a temperature difference between said heated and cooled portions.

30. A thermal barrier system comprising
(A) a garment having fluid passageways,
(B) a heat generating unit including
  (1) means for ataching said unit to a garment user thereof,
  (2) a heat source of the type that generates heat through chemical reaction of a fuel contained therein
  (3) means forming a first fluid jacket arranged to intercept heat conducted from said source, and
  (4) a pump connected to pump fluid from said garment through said first jacket and back to said garment,
(C) a single-loop fluid circulating system arranged to
  (1) heat a heat-conveying fluid by means of direct thermal conduction from said source, and,
  (2) circulate said fluid through said garment passageways,
(D) a tempering heat exchanger exposed to an environmental fluid surrounding said user,
(E) means for passing a portion of the circulating fluid through said heat exchanger thereby cooling said fluid, and
(F) means operable by the wearer of said garment for varying the portions of fluid flowing through said heat exchanger thereby to adjust the temperature of the fluid entering said garment.

31. The combination defined in claim 29 including a proportioning valve
(A) receiving the fluid returning from said garment, and
(B) dividing said returning fluid between said first and second jackets.

32. The combination defined in claim 31
(A) in which said proportioning valve is arranged to respond to the thermal output of said heat source,
(B) thereby to decrease the relative proportion of fluid flowing through said first jacket as said thermal output of said cell decreases.

References Cited
UNITED STATES PATENTS

| | | | |
|---|---|---|---|
| 2,541,328 | 2/1951 | Boklep | 126—360 |
| 3,265,125 | 8/1966 | Rosenblatt | 126—263 XR |
| 3,108,937 | 10/1963 | Kumpf et al. | 176—65 X |
| 3,112,792 | 12/1963 | Coleman et al. | 165—46 |
| 3,295,594 | 1/1967 | Hopper | 126—208 X |

FREDRICK L. MATTESON, JR., Primary Examiner

E. G. FAVORS, Assistant Examiner

U.S. Cl. X.R.

165—29

PO-1050
(5/69)

UNITED STATES PATENT OFFICE
CERTIFICATE OF CORRECTION

Patent No. 3,513,824          Dated May 26, 1970

Inventor(s) J. J. Fitzgerald et al

It is certified that error appears in the above-identified patent and that said Letters Patent are hereby corrected as shown below:

Column 1, line 5, the phrase ", assignors to Sanders Nuclear Corporation, Nashua, N. H., a Corporation of Delaware" should be added.

Column 10, line 34, "117" should read "171".

SIGNED AND
SEALED

OCT 27 1970

(SEAL)
Attest:

Edward M. Fletcher, Jr.
Attesting Officer

WILLIAM E. SCHUYLER, JR.
Commissioner of Patents